(12) United States Patent
Hanrahan et al.

(10) Patent No.: US 12,385,434 B2
(45) Date of Patent: Aug. 12, 2025

(54) AIRCRAFT POWERPLANT WITH BOOSTED GAS TURBINE ENGINE

(71) Applicant: Raytheon Technologies Corporation, Farmington, CT (US)

(72) Inventors: Paul R. Hanrahan, Sedona, AZ (US); Daniel B. Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/849,668

(22) Filed: Jun. 26, 2022

(65) Prior Publication Data

US 2023/0415902 A1    Dec. 28, 2023

(51) Int. Cl.
| | |
|---|---|
| *F02C 6/20* | (2006.01) |
| *B64D 27/10* | (2006.01) |
| *B64D 27/24* | (2006.01) |
| *B64D 29/00* | (2006.01) |
| *B64D 35/00* | (2006.01) |
| *B64D 27/02* | (2006.01) |

(52) U.S. Cl.
CPC ............ *B64D 27/10* (2013.01); *B64D 27/24* (2013.01); *B64D 29/00* (2013.01); *B64D 35/00* (2013.01); *F02C 6/206* (2013.01); *B64D 27/026* (2024.01); *B64D 2221/00* (2013.01); *F05D 2220/323* (2013.01); *F05D 2220/74* (2013.01); *F05D 2220/76* (2013.01)

(58) Field of Classification Search
CPC ...... F02C 7/32; F02C 7/36; F02C 6/00; F02C 6/08; F02C 9/18; F02C 6/02; F02C 9/16; F02C 9/44; F02C 6/04; F02C 6/10; F02C 6/18
See application file for complete search history.

(56) References Cited

U.S. PATENT DOCUMENTS

| | | | | |
|---|---|---|---|---|
| 3,963,372 | A * | 6/1976 | McLain | B64C 27/14 60/39.15 |
| 5,555,722 | A * | 9/1996 | Mehr-Ayin | F02C 7/32 60/788 |
| 10,760,484 | B2 * | 9/2020 | Alecu | F02C 6/20 |
| 10,822,100 | B2 * | 11/2020 | Dindar | H02K 7/1823 |
| 11,143,142 | B2 | 10/2021 | Hanrahan | |

(Continued)

*Primary Examiner* — Thuyhang N Nguyen
(74) *Attorney, Agent, or Firm* — Getz Balich LLC

(57) ABSTRACT

An aircraft system is provided that includes a first gas turbine engine, a propulsor rotor, a second gas turbine engine, an electric generator and an electric component. The first gas turbine engine includes a first compressor section, a first combustor section, a first turbine section and a first flowpath. The propulsor rotor is rotatably driven by the first gas turbine engine. The second gas turbine engine includes a second compressor section, a second combustor section, a second turbine section and a second flowpath between a second inlet and a second exhaust. The second inlet and the second exhaust are each fluidly coupled with the first flowpath upstream of a combustor of the first combustor section. The electric generator is rotatably driven by the second gas turbine engine. The electric component receives electricity generated by the electric generator. The electric component is discrete from the first gas turbine engine.

20 Claims, 6 Drawing Sheets

(56) References Cited

U.S. PATENT DOCUMENTS

| | | | |
|---|---|---|---|
| 2005/0284150 A1* | 12/2005 | Dittmar | F01D 15/10 60/788 |
| 2010/0170262 A1* | 7/2010 | Kaslusky | F02C 7/32 60/788 |
| 2010/0300117 A1* | 12/2010 | Moulebhar | F02C 7/32 60/801 |
| 2011/0173988 A1* | 7/2011 | Sweet | F02C 9/46 60/773 |
| 2012/0119021 A1* | 5/2012 | Burns | B64D 27/16 244/58 |
| 2015/0122944 A1* | 5/2015 | Dauriac | B64D 35/08 244/58 |
| 2015/0275758 A1* | 10/2015 | Foutch | F02C 7/047 60/785 |
| 2016/0273396 A1* | 9/2016 | Ekanayake | F02C 6/00 |
| 2016/0355272 A1* | 12/2016 | Moxon | B64D 35/04 |
| 2018/0051584 A1* | 2/2018 | Malkamäki | F01D 15/10 |
| 2018/0163558 A1* | 6/2018 | Vondrell | B64D 27/10 |
| 2018/0291807 A1* | 10/2018 | Dalal | F02K 5/00 |
| 2019/0323426 A1* | 10/2019 | Mackin | B64D 27/16 |
| 2020/0017229 A1* | 1/2020 | Steinert | F02K 3/075 |
| 2020/0040848 A1* | 2/2020 | Hanrahan | F02K 3/077 |
| 2020/0056497 A1 | 2/2020 | Terwilliger | |
| 2020/0158213 A1* | 5/2020 | Leque | F02K 3/06 |
| 2020/0400077 A1 | 12/2020 | Redford | |

\* cited by examiner

AIRCRAFT POWERPLANT WITH BOOSTED GAS TURBINE ENGINE

BACKGROUND OF THE DISCLOSURE

1. Technical Field

This disclosure relates generally to an aircraft and, more particularly, to a multi-engine powerplant for the aircraft.

2. Background Information

Various types and configurations of powerplants are known in the art for an aircraft. While these known aircraft powerplants have various benefits, there is still room in the art for improvement. There is a need in the art, in particular, for an improved multi-engine aircraft powerplant.

SUMMARY OF THE DISCLOSURE

According to an aspect of the present disclosure, an aircraft system is provided that includes a first gas turbine engine, a propulsor rotor, a second gas turbine engine, an electric generator and an electric component. The first gas turbine engine includes a first inlet, a first exhaust, a first compressor section, a first combustor section, a first turbine section and a first flowpath fluidly coupled with and between the first inlet and the first exhaust. The first flowpath extends sequentially through the first compressor section, the first combustor section and the first turbine section. The combustor section includes a combustor. The propulsor rotor is configured to be rotatably driven by the first gas turbine engine. The second gas turbine engine includes a second inlet, a second exhaust, a second compressor section, a second combustor section, a second turbine section and a second flowpath fluidly coupled with and between the second inlet and the second exhaust. The second flowpath extends sequentially through the second compressor section, the second combustor section and the second turbine section. The second inlet and the second exhaust are each fluidly coupled with the first flowpath upstream of the combustor. The electric generator is configured to be rotatably driven by the second gas turbine engine. The electric component is configured to receive electricity generated by the electric generator. The electric component is discrete from the first gas turbine engine.

According to another aspect of the present disclosure, another aircraft system is provided that includes a first gas turbine engine, a propulsor rotor, a second gas turbine engine, an electric generator and an electric component. The first gas turbine engine includes a first compressor section, a first combustor section, a first turbine section and a first flowpath extending sequentially through the first compressor section, the first combustor section and the first turbine section. The combustor section includes a combustor. The propulsor rotor is configured to be rotatably driven by the first gas turbine engine. The second gas turbine engine includes a second inlet, a second exhaust, a second compressor section, a second combustor section, a second turbine section and a second flowpath fluidly coupled with and between the second inlet and the second exhaust. The second flowpath extends sequentially through the second compressor section, the second combustor section and the second turbine section. The second inlet is fluidly coupled with the first flowpath upstream of the combustor. The second exhaust is fluidly coupled with the first flowpath. The electric generator is configured to be rotatably driven by the second gas turbine engine. The electric component is configured to receive electricity generated by the electric generator. The electric component is located outside of the first gas turbine engine.

According to still another aspect of the present disclosure, another aircraft system is provided that includes a first gas turbine engine, a propulsor rotor, a second gas turbine engine, an electric generator and an electric component. The first gas turbine engine includes a first compressor section, a first combustor section, a first turbine section, a first rotating structure and a first flowpath extending sequentially through the first compressor section, the first combustor section and the first turbine section. The combustor section includes a combustor. The first rotating structure includes a first turbine rotor within the first turbine section. The propulsor rotor is configured to be rotatably driven by the first rotating structure. The second gas turbine engine includes an inlet, an exhaust, a second compressor section, a second combustor section, a second turbine section, a second rotating structure and a second flowpath fluidly coupled with and between the inlet and the exhaust. The second flowpath extends sequentially through the second compressor section, the second combustor section and the second turbine section. The inlet is configured to bleed air out of the first flowpath upstream of the combustor. The exhaust is configured to direct exhaust from the second gas turbine engine into the first flowpath. The second rotating structure includes a second turbine rotor within the second turbine section. The electric generator is configured to be rotatably driven by the second rotating structure. The electric component is configured to receive electricity generated by the electric generator. The electric component is independent of the first gas turbine engine.

The electric component may be configurable as an electric motor that drives rotation of the propulsor rotor.

The aircraft system may also include an aircraft cabin electrical system that includes the electric component.

The electric component may be located within a fuselage of an aircraft.

The aircraft system may also include a nacelle housing the first gas turbine engine. The electric component may be located outside of the nacelle.

The electric generator may be electrically decoupled from electric components of the first gas turbine engine.

The electric component may include an electric motor located outside of the first gas turbine engine. The electric motor may also be configured to drive rotation of the propulsor rotor.

The aircraft system may also include a gearbox mechanically coupling an output from the first gas turbine engine and an output from the electric motor to the propulsor rotor.

The second inlet may be fluidly coupled to the first flowpath at an inlet coupling. The second exhaust may be fluidly coupled to the first flowpath at an exhaust coupling. The inlet coupling may be upstream of the exhaust coupling along the first flowpath.

The second inlet may be fluidly coupled to the first flowpath along the first compressor section.

The second inlet may be fluidly coupled to the first flowpath downstream of the first compressor section.

The second inlet may be fluidly coupled to the first flowpath at a diffuser.

The aircraft system may also include a flow regulator configured to regulate gas flow from the first gas turbine engine to the second gas turbine engine through the second inlet.

The propulsor rotor may be configured as or otherwise include an open rotor.

The propulsor rotor may be configured as or otherwise include a ducted rotor.

The first gas turbine engine may also include a low pressure compressor section. The first compressor section may be configured as a high pressure compressor section between the low pressure compressor section and the combustor section along the first flowpath.

The first gas turbine engine may also include a low pressure turbine section. The first turbine section may be configured as a high pressure turbine section between the low pressure turbine section and the combustor section along the first flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
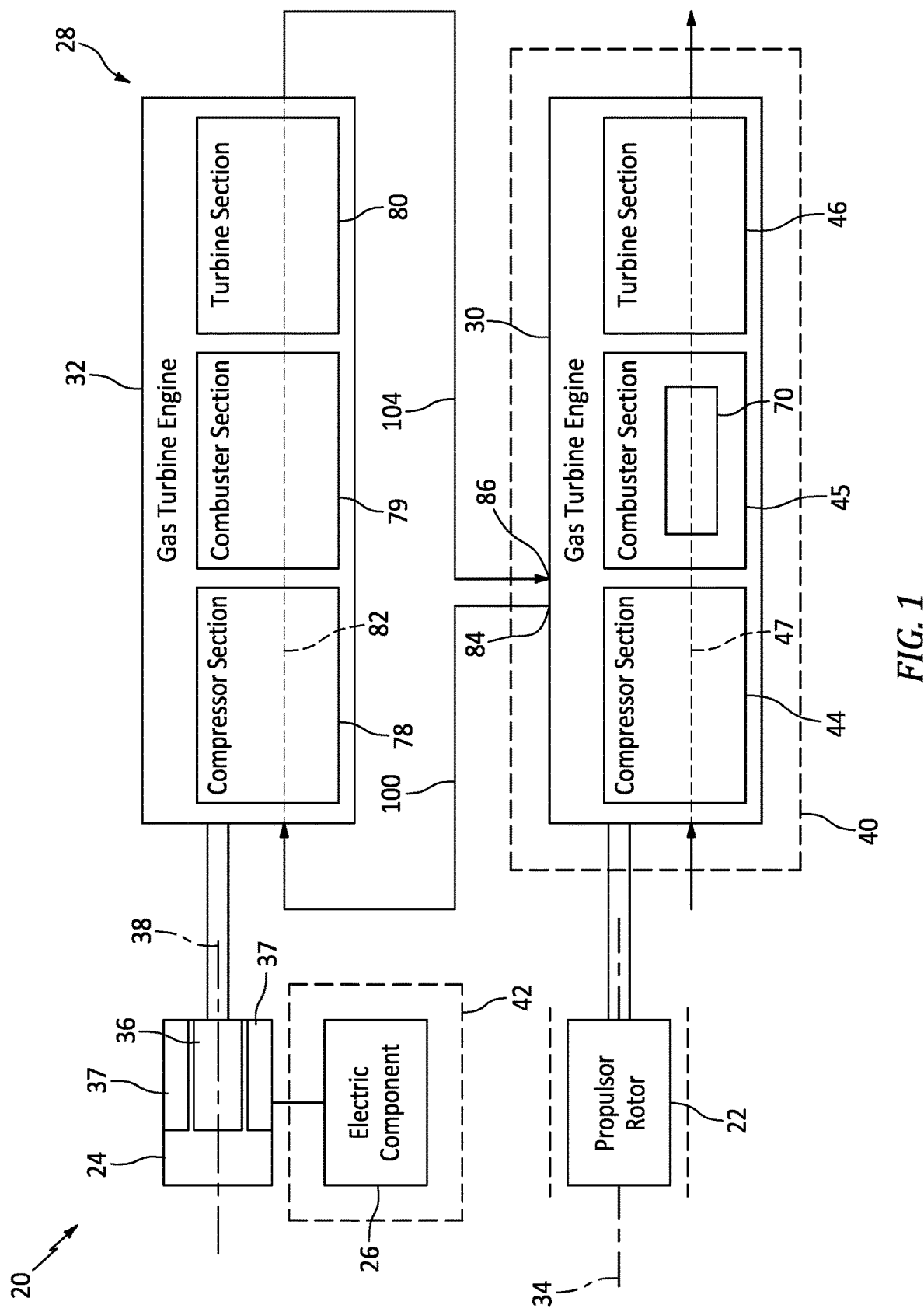
FIG. 1 is a schematic illustration of a system for an aircraft with a multi-engine powerplant.

FIG. 1 is a schematic illustration of a system 20 for an aircraft. The aircraft may be an airplane, a helicopter, a drone (e.g., an unmanned aerial vehicle (UAV)), a spacecraft or any other manned or unmanned aerial vehicle. The aircraft system 20 of FIG. 1 includes a propulsor rotor 22, an electric generator 24 and an electric component 26 of the aircraft. The aircraft system 20 also includes a powerplant 28 configured to power the propulsor rotor 22 and the electric generator 24. The aircraft powerplant 28 includes a first (e.g., primary, propulsion) gas turbine engine 30 and a second (e.g., secondary, generator) gas turbine engine 32 in fluid communication with the first gas turbine engine 30.

The propulsor rotor 22 may be configured as an open rotor such as a propeller rotor or a helicopter (e.g., main) rotor. Alternatively, the propulsor rotor 22 may be configured as a ducted rotor such as a fan rotor; e.g., see dashed line duct. The propulsor rotor 22 is rotatable about a propulsor axis 34, which propulsor axis 34 may be an axial centerline of the propulsor rotor 22. The propulsor rotor 22 includes at least one propulsor rotor disk and a plurality of propulsor rotor blades. The propulsor rotor blades are distributed circumferentially around the propulsor rotor disk in an annular array. Each of the propulsor rotor blades is connected to and projects radially (relative to the propulsor axis 34) out from the propulsor rotor disk.

The electric generator 24 is configured to generate electric power. The electric generator 24 of FIG. 1 includes a generator rotor 36 and a generator stator 37. The generator rotor 36 is rotatable about a generator axis 38, which generator axis 38 may be an axial centerline of the generator rotor 36 and/or the generator stator 37. The generator stator 37 axially overlaps and extends circumferentially about (e.g., circumscribes) the generator rotor 36. During operation of the electric generator 24, the generator rotor 36 rotates about the generator axis 38 relative to the generator stator 37. The movement between the generator rotor 36 and the generator stator 37 produces electricity through electromagnetic induction. The electric generator 24 is thereby operable to convert mechanical power (via rotation of the generator rotor 36) into electric power (via the electricity).

The electric component 26 is configured to receive electrical power/electricity generated by the electric generator 24. The electric component 26, more particularly, is electrically coupled to the electric generator 24. This electric coupling may be a relatively direct coupling through, for example, one or more wires and/or switches. The electrical coupling may alternatively be an indirect coupling through, for example, an aircraft power grid; e.g., an electrical network onboard the aircraft. For example, electricity generated by the electric generator 24 may be routed indirectly to the electric component 26 through a battery and/or one or more other intermediate devices, buffers, etc.

The electric component 26 may be configured as any component of the aircraft which is utilizes electricity. Examples of the electric component 26 may include, but are not limited to, an electric motor, a sensor, a controller, a transmitter, a receiver, a display screen, an electroacoustic transducer (e.g., a speaker), an electrically actuated valve, an electrically actuated switch, an electric pump, a solenoid, a rectifier, a field regulator, a direct current (DC) generator, a permanent magnet motor, a brushless direct current (DC) motor and a rotary converter. This electric component 26 may be included as part of an environmental system for the aircraft, a communication system for the aircraft, a sensor system for the aircraft, a cabin electrical system for the aircraft (e.g., for a cockpit, a passenger compartment and/or a cargo compartment), a flight control system for the aircraft, a hydrolysis process unit, a magneto hydrodynamic propulsion drive, etc. The electric component 26 may also or alternatively be included as part of a drive system for the propulsor rotor 22. For example, referring to FIG. 2, the electric component 26 may be configured as an electric motor (or an electric machine) for selectively driving rotation of the propulsor rotor 22 (or another propulsor rotor) as described below in further detail.

The electric component 26 is configured discrete from the first gas turbine engine 30. The electric component 26 of FIGS. 1 and 2, for example, is located remote from (e.g., outside of) the first gas turbine engine 30. The electric component 26 of FIG. 1 is also located outside of an engine nacelle 40, which engine nacelle 40 houses and provides an aerodynamic cover for at least (or only) the first gas turbine engine 30. The electric component 26 of FIG. 1, for example, may be located with (e.g., within) an aircraft structure 42 different than the engine nacelle 40. Examples of the aircraft structure 42 include, but are not limited to, a fuselage of the aircraft, a wing of the aircraft, a canard, a pod, and a stabilizer of the aircraft. Alternatively, referring to FIG. 2, the electric component 26 (e.g., the electric motor) may be arranged within the engine nacelle 40 and/or otherwise near the first gas turbine engine 30. The electric component 26 of FIGS. 1 and 2, however, may not be at least directly (or even indirectly in some embodiments) electrically and/or mechanically coupled to the first gas turbine engine 30 and its various internal components. For example, even where the electric component 26 and the first gas turbine engine 30 of FIG. 2 may both be used to drive rotation of the propulsor rotor 22 as described below in further detail, the electric component 26 may not directly influence (e.g., enhance) operation of the first gas turbine engine 30, for example, by helping to rotate (or brake) a rotor within the first gas turbine engine 30. Of course, the aircraft system 20 may (or may not) include one or more other electric components within the gas turbine engine that are powered by the electric generator 24, which other electric component(s) may (or may not) influence operation of the first gas turbine engine 30.

Figure 3:
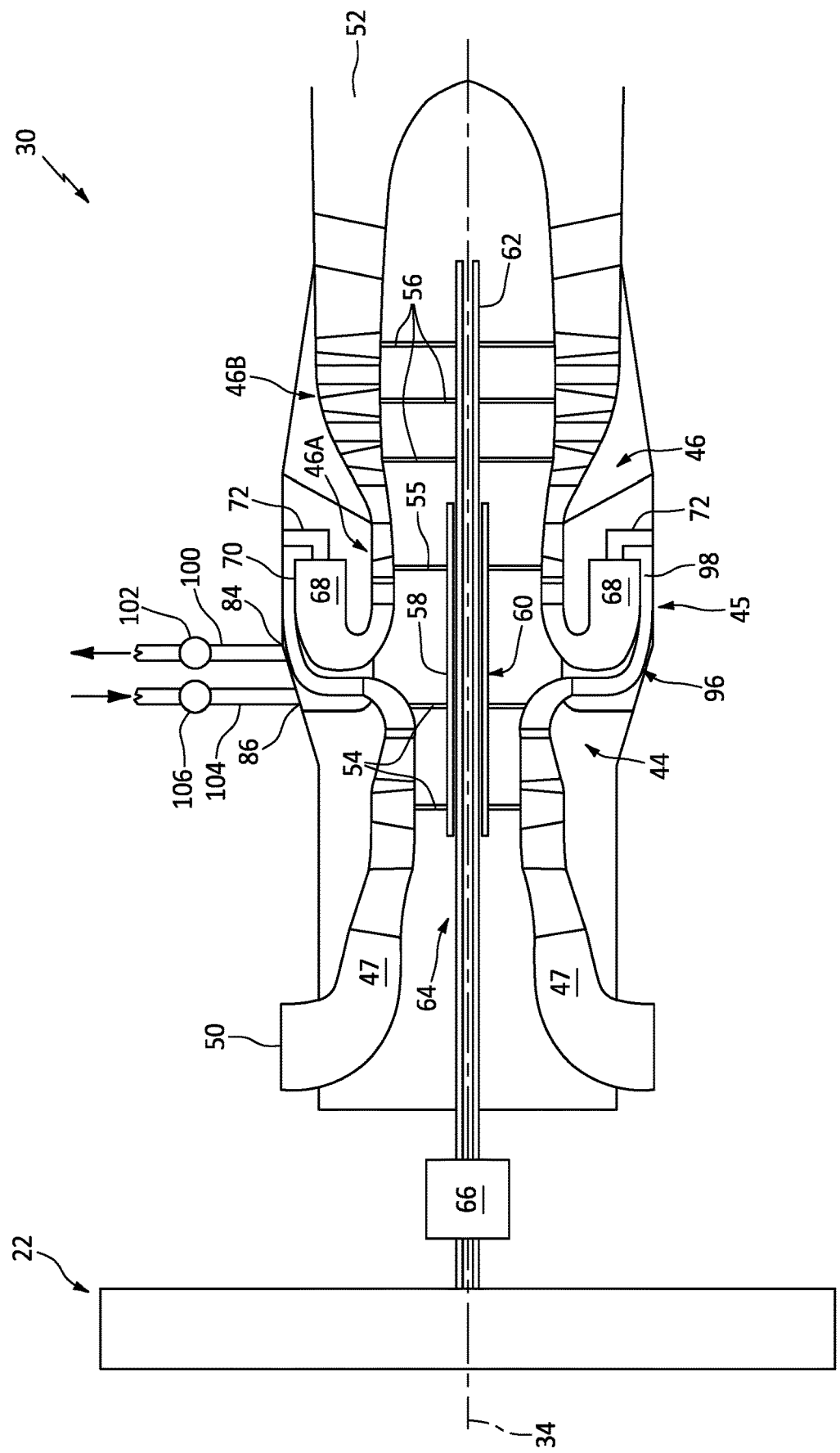
FIG. 3 is a detailed schematic illustration of a first gas turbine engine configured to drive the propulsor rotor.

Referring to FIG. 3, the first gas turbine engine 30 may be configured as a turboprop engine or a turboshaft engine. The first gas turbine engine 30 of FIG. 3 includes a first engine compressor section 44, a first engine combustor section 45, a first engine turbine section 46 and a first engine flowpath 47; e.g., a core flowpath. The first engine turbine section 46 of FIG. 3 includes a first engine high pressure turbine (HPT) section 46A and a first engine low pressure turbine (LPT) section 46B, which first engine LPT section 46B may also be referred to as a power turbine section. The first engine flowpath 47 extends sequentially through the first engine sections 44-46B between and to an airflow inlet 50 into the first gas turbine engine 30 and its first engine flowpath 47 and a combustion products exhaust 52 from the first gas turbine engine 30 and its first engine flowpath 47.

Each of the first engine sections 44, 46A and 46B includes a respective bladed rotor 54-56. Each of these bladed rotors 54-56 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 54 is connected to and rotatably driven by the HPT rotor 55 through a high speed shaft 58. The compressor rotor 54, the HPT rotor 55 and the high speed shaft 58 may collectively form a high speed rotating structure 60 (e.g., a high speed/high pressure spool) within the first gas turbine engine 30.

The LPT rotor 56 is connected to and rotatably drives a low speed shaft 62. The LPT rotor 56 and the low speed shaft 62 may collectively form a low speed rotating structure 64 (e.g., a low speed/low pressure spool) within the first gas turbine engine 30. This low speed rotating structure 64 is also mechanically connected to the propulsor rotor 22. This connection between the low speed rotating structure 64 and the propulsor rotor 22 may be through a gearbox 66 (e.g., a transmission) such that the low speed rotating structure 64 may rotate at a different (e.g., faster) speed than the propulsor rotor 22. The gearbox 66 may include an epicyclic geartrain with a star or planetary gear system. Alternatively, the connection between the low speed rotating structure 64 and the propulsor rotor 22 may be a direct drive connection (e.g., where the gearbox 66 is omitted) such that the low speed rotating structure 64 and the propulsor rotor 22 rotate at a common (the same) speed.

During operation of the first gas turbine engine 30, air (e.g., fresh air, air from outside of the aircraft powerplant 28) enters the first gas turbine engine 30 through the first engine inlet 50. This air is directed into the first engine flowpath 47. The air within the first engine flowpath 47 may be referred to as first engine core air.

The first engine core air is compressed by the compressor rotor 54 and directed into a (e.g., annular) combustion chamber 68 of a (e.g., annular) combustor 70 in the first engine combustor section 45. Fuel is injected into the combustion chamber 68 via one or more fuel injectors 72 and mixed with the compressed first engine core air to provide a fuel-air mixture. This fuel-air mixture is ignited and combustion products thereof flow through and sequentially cause the HPT rotor 55 and the LPT rotor 56 to rotate. The rotation of the HPT rotor 55 drives rotation of the compressor rotor 54 and, thus, compression of the air received from first engine inlet 50. The rotation of the LPT rotor 56 drives rotation of the propulsor rotor 22 through the gearbox 66 (or alternatively directly). The propulsor rotor 22 propels additional air outside of the first gas turbine engine 30 to provide aircraft propulsion system thrust and/or lift. The propulsor rotor 22 also or alternatively provides aircraft control of pitch, yaw, and/or roll.

Figure 4:
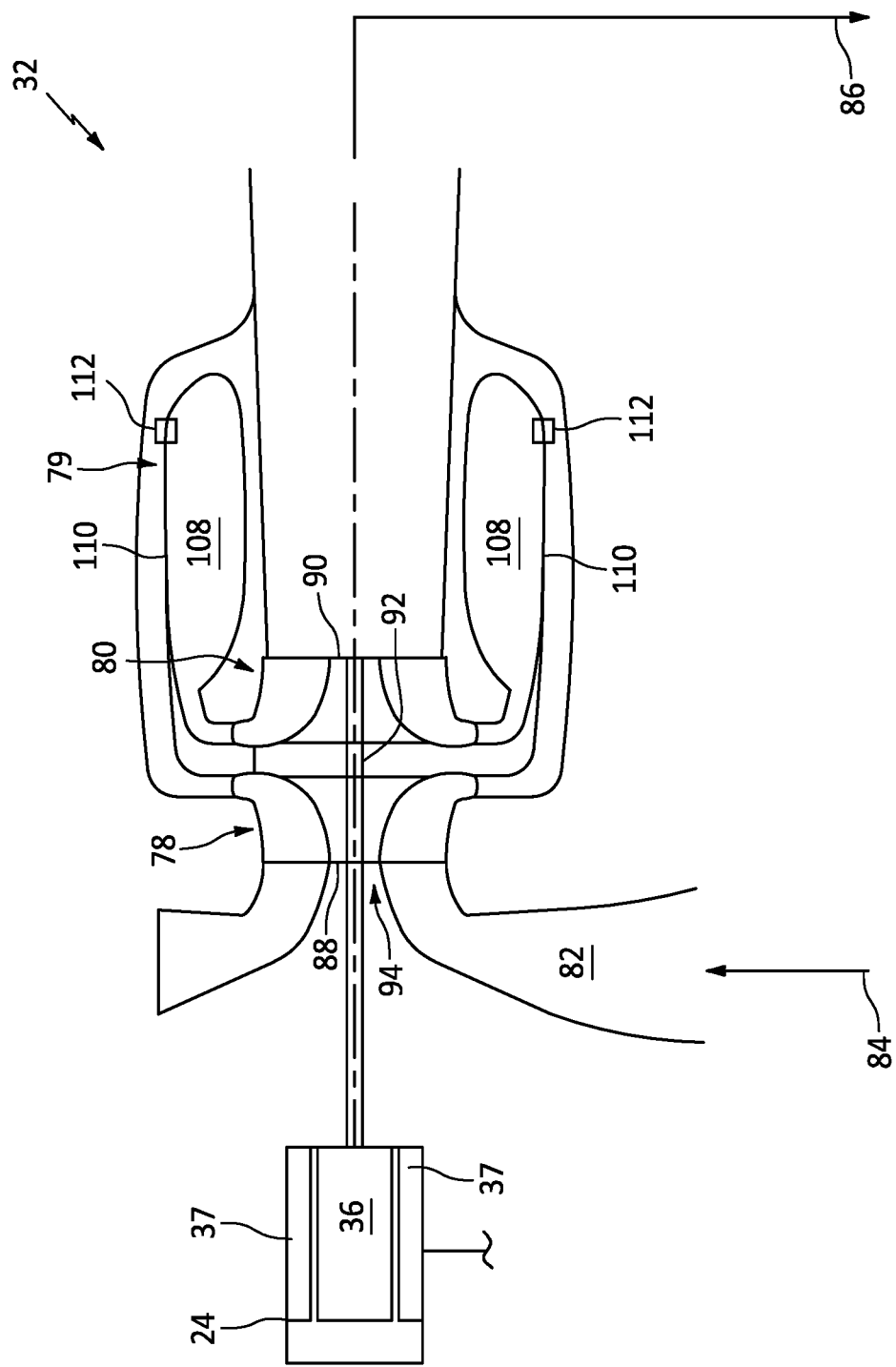
FIG. 4 is a detailed schematic illustration of a second gas turbine engine configured to drive an electric generator.

Referring to FIG. 4, the second gas turbine engine 32 may be configured as an auxiliary power unit (APU) for the aircraft. The second gas turbine engine 32 of FIG. 4 includes a second engine compressor section 78, a second engine combustor section 79, a second engine turbine section 80 and a second engine flowpath 82; e.g., a core flowpath. The second engine flowpath 82 extends sequentially through the second engine sections 78-80 between and to an airflow inlet 84 into the second gas turbine engine 32 and its second engine flowpath 82 and a combustion products exhaust 86 from the second gas turbine engine 32 and its second engine flowpath 82.

Each of the second engine sections 78 and 80 includes a respective bladed rotor 88 and 90. Each of these bladed rotors 88 and 90 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 88 is connected to and rotatably driven by the turbine rotor 90 through a shaft 92. The compressor rotor 88, the turbine rotor 90 and the shaft 92 may collectively form a rotating structure 94 (e.g., a spool) within the second gas turbine engine 32. The rotating structure 94 is also connected to the generator rotor 36. This connection between the rotating structure 94 and the generator rotor 36 may be a direct drive connection such that the rotating structure 94 and the generator rotor 36 rotate at a common (the same) speed. Alternatively, the connection between the rotating structure 94 and the generator rotor 36 may be through an optional gearbox (e.g., a transmission; not shown) such that the rotating structure 94 may rotate at a different (e.g., faster or slower) speed than the generator rotor 36.

Figure 2:
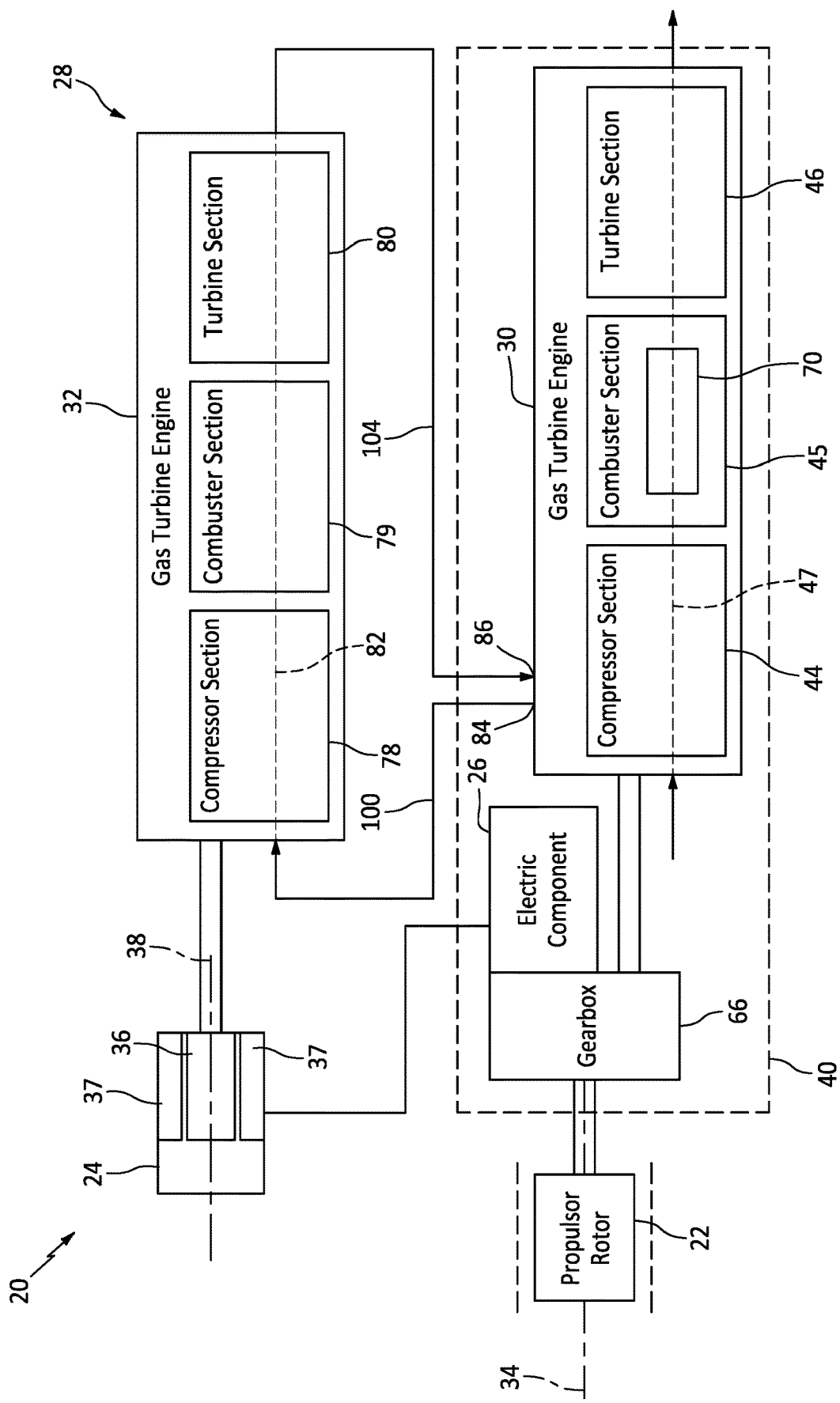
FIG. 2 is a schematic illustration of the aircraft system where the multi-engine powerplant is configured as a hybrid powerplant for driving a propulsor rotor.

Referring to FIGS. 1 and 2, the second engine inlet 84 is fluidly coupled with the first gas turbine engine 30 and its first engine flowpath 47. This second engine inlet 84 is configured to receive (e.g., bleed) the first engine core air from the first engine flowpath 47, for example upstream of the combustor 70. The second engine inlet 84 of FIG. 3, for example, is formed by and/or in a component (e.g., a case, vane arrangement, etc.) of the first gas turbine engine 30. The second engine inlet 84 may be located in/along the first engine compressor section 44. Alternatively, the second engine inlet 84 may be located in/along the first engine combustor section 45. For example, referring to FIG. 3, the second engine inlet 84 may be located at (e.g., on, adjacent or proximate) a diffuser 96 between the first engine compressor section 44 and a plenum 98 surrounding the combustor 70. The second engine inlet 84 is fluidly coupled to the second engine compressor section 78 (see FIG. 4) through an inlet duct 100. This inlet duct 100 (or the second engine inlet 84) may be configured with a flow regulator 102 (e.g., a valve) for regulating the flow of the first engine core air diverted out of the first engine flowpath 47 to the second gas turbine engine 32.

Referring to FIGS. 1 and 2, the second engine exhaust 86 is fluidly coupled with the first gas turbine engine 30 and its first engine flowpath 47. This second engine exhaust 86 is configured to direct exhaust (e.g., combustion products) from the second gas turbine engine 32 into the first engine flowpath 47, for example upstream of the combustor 70 and/or downstream of the second engine inlet 84. The second engine exhaust 86 of FIG. 3, for example, is formed by and/or in another component (e.g., a case, vane arrangement, etc.) or the component of the first gas turbine engine 30. The second engine exhaust 86 may be located in/along the first engine combustor section 45. For example, referring to FIG. 3, the second engine exhaust 86 may be located at (e.g., on, adjacent or proximate) the diffuser 96. The second engine exhaust 86 is fluidly coupled to the second engine turbine section 80 (see FIG. 4) through an exhaust duct 104. This exhaust duct 104 (or the second engine exhaust 86) may be configured with a flow regulator 106 (e.g., a valve) for regulating the flow of the gas exhausted from the second gas turbine engine 32 (see FIG. 4) and directed into the first gas turbine engine 30.

During operation of the second gas turbine engine 32 of FIGS. 1, 2 and 4, the first engine core air bled from the first engine flowpath 47 enters the second gas turbine engine 32 through the second engine inlet 84 and the inlet duct 100. This air is directed into the second engine flowpath 82. The air within the second engine flowpath 82 may be referred to as second engine core air.

The second engine core air is compressed by the compressor rotor 88 and directed into a (e.g., annual) combustion chamber 108 of a (e.g., annular) combustor 110 in the second engine combustor section 79. Fuel is injected into the combustion chamber 108 via one or more fuel injectors 112 and mixed with the compressed second engine core air to provide a fuel-air mixture. This fuel-air mixture is ignited and combustion products thereof flow through and cause the turbine rotor 90 to rotate. The rotation of the turbine rotor 90 drives rotation of the compressor rotor 88 and, thus, compression of the first engine core air received from the second engine inlet 84. The rotation of the turbine rotor 90 also drives rotation of the generator rotor 36; e.g., directly or indirectly through the gearbox (not shown). The rotation of the generator rotor 36, in turn, generates electric power/electricity as described above.

Figure 5:
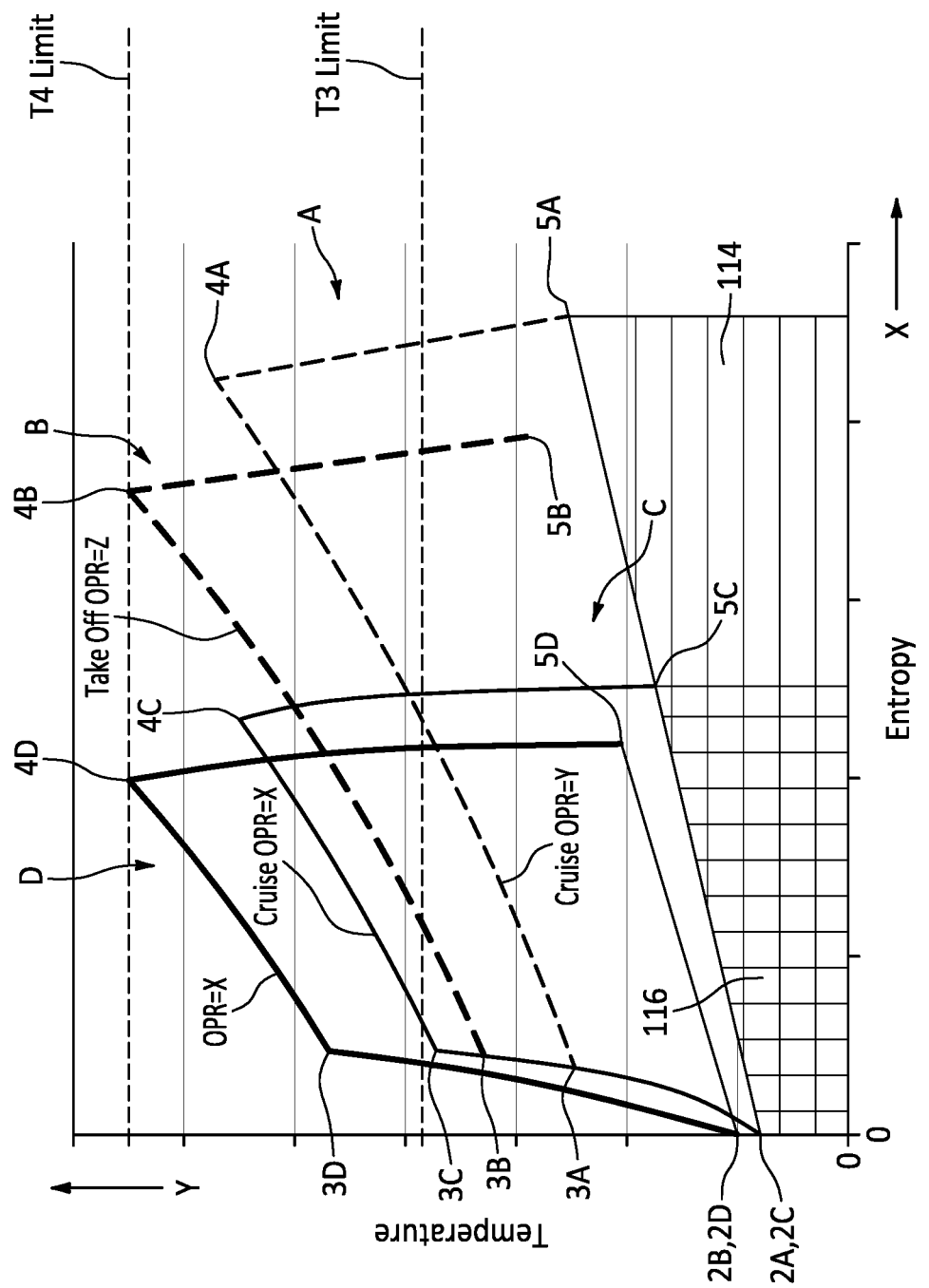
FIG. 5 is a T-s diagram illustrating thermodynamic performance of the first gas turbine engine boosted by the second gas turbine engine relative to the first gas turbine engine operated without the second gas turbine engine.

FIG. 5 is a T-s diagram illustrating thermodynamic performance of the first gas turbine engine 30 boosted by the second gas turbine engine 32 (a boosted gas turbine engine) relative to the first gas turbine engine 30 operated without being boosted by the second gas turbine engine 32 (an un-boosted gas turbine engine). Entropy is plotted along an x-axis, and temperature is plotted along a y-axis. Dashed curve A depicts a thermodynamic cycle of the un-boosted first gas turbine engine 30 operating at cruise power. Dashed curve B depicts a thermodynamic cycle of the un-boosted first gas turbine engine 30 operating at takeoff power on a hot day. Solid curve C depicts the boosted first gas turbine engine 30 operating with second gas turbine engine 32 at cruise power. Solid curve D depicts another gas turbine engine operating at takeoff power on a hot day having an overall pressure ratio (OPR) (value=X) that is equal to an overall pressure ratio of the boosted first gas turbine engine 30 operating at cruise power.

Each of the curves A, B, C and D is defined by points 2, 3, 4, and 5, respectively. The dashed curve A extends from point 2A to point 3A, representing compression work completed by the un-boosted first gas turbine engine 30 between an inlet and an exit of the compressor section 44. From point 3A, the dashed curve A extends along a line of constant pressure ratio (value=Y) to point 4A that represents heat added to a core airflow through combustion. After combustion, the HPT section 46A and the LPT section 46B extract work from the heated and compressed core flow, a process represented by dashed line A between points 4A and 5A. The dashed curve B extends between point 2B to point 3B during the compression phase, between point 3B and 4B along a line of constant pressure ratio (value=Z) during combustion, and between point 4B and 5B during turbine expansion. The solid curves C and D are defined by points 2C, 3C, 4C, and 5C and points 2D, 3D, 4D, and 5D in a similar manner to the curves A and B. An engine operating along the curve A has less overall pressure ratio (value Y) than an engine operating on any of the other curves; e.g., curves C and D have an overall pressure ratio equal to value X and the curve B has an overall pressure ratio value equal to Z. An engine operating on the curves C and D also have an overall pressure ratio value X that is greater than an engine operating on curve B with an overall pressure ratio value Z.

The temperature entering the compressor section 44 of the first gas turbine engine 30 at cruise power is lower than the temperature entering the compressor section 44 of the first gas turbine engine 30 at takeoff power because the ambient temperature at cruising altitude is lower than the ambient temperature during a hot day takeoff. For example, the ambient temperature may be approximately −26.1 degrees Celsius (e.g., about −15 degrees Fahrenheit) at cruise altitude, while the ambient temperature may be approximately 46.1 degrees Celsius (e.g., about 115 degrees Fahrenheit) on a hot day takeoff. For each curve, the temperature within the engine at points 3A, 3B, 3C, and 3D are limited to a line of constant temperature labeled "T3 Limit" while the temperature at points 4A, 4B, 4C, and 4D are limited to a line of constant temperature labeled "T4 Limit".

The un-boosted operation of the first gas turbine engine 30 represented by dashed curves A and B provides a compromise between temperature limits during a hot day takeoff and cruise. The overall pressure ratio of the un-boosted first gas turbine engine 30 may thereby be limited by hot day takeoff conditions; e.g., the temperature at point 4B may be limited by the T3 Limit. The area bounded by the dashed curve A and a line connecting points 5A and 2A represent the amount of work completed by the first gas turbine engine 30 while operating at cruise power and without operating the second gas turbine engine 32. The amount of heat energy rejected by the first gas turbine engine 30 while operating in accordance with dashed curve A is shown by horizontally-hatched area 114. The thermodynamic efficiency of first gas turbine engine 30 operating in accordance with the dashed curve A is the work energy divided by the summation of work and rejected heat energy defined by the dashed curve A.

The work performed by the first gas turbine engine 30 while the second gas turbine engine 32 is operating is bounded by the curve C and a line extending between points 5C and 2C while the heat energy rejected by boosted first gas turbine engine 30 operating at cruise power is shown by vertically-hatched area 116. Regions where areas 114 and 116 overlap appear as a square-hatched area. By comparing work areas bounded by the curves A and C relative to the heat rejection areas 114 and 116, respectively, it is evident that the work area C represents a larger percentage of the total area under the curve C than corresponding areas under the curve A. Accordingly, operating the first gas turbine engine 30 with the second gas turbine engine 32 at cruise power results in more efficient thermodynamic operation and, thus, improved thrust specific fuel consumption (TSFC) than operating the first gas turbine engine 30 without the second gas turbine engine 32. Furthermore, a gas turbine engine with the same overall pressure ratio as the boosted first gas turbine engine 30 operation depicted by the curve D may not satisfy thermal limits at points 3D and 4D as shown in FIG. 5; e.g., the temperature at 3D exceeds the T3 Limit, and the temperature at 4D exceeds the T4 limit. The first gas turbine engine 30 may thereby be operated without the second gas turbine engine 32 during hot day takeoff conditions (e.g., the dashed curve B) and may be operated with the second gas turbine engine 32 at cruise power (e.g., the solid curve C) to achieve greater thermal efficiency at cruise power while satisfying thermal limits for hot day takeoff conditions. Of course, the second gas turbine engine 32 may also or alternatively be operated when needed to provide electrical power to the engine component 26.

Figure 6:
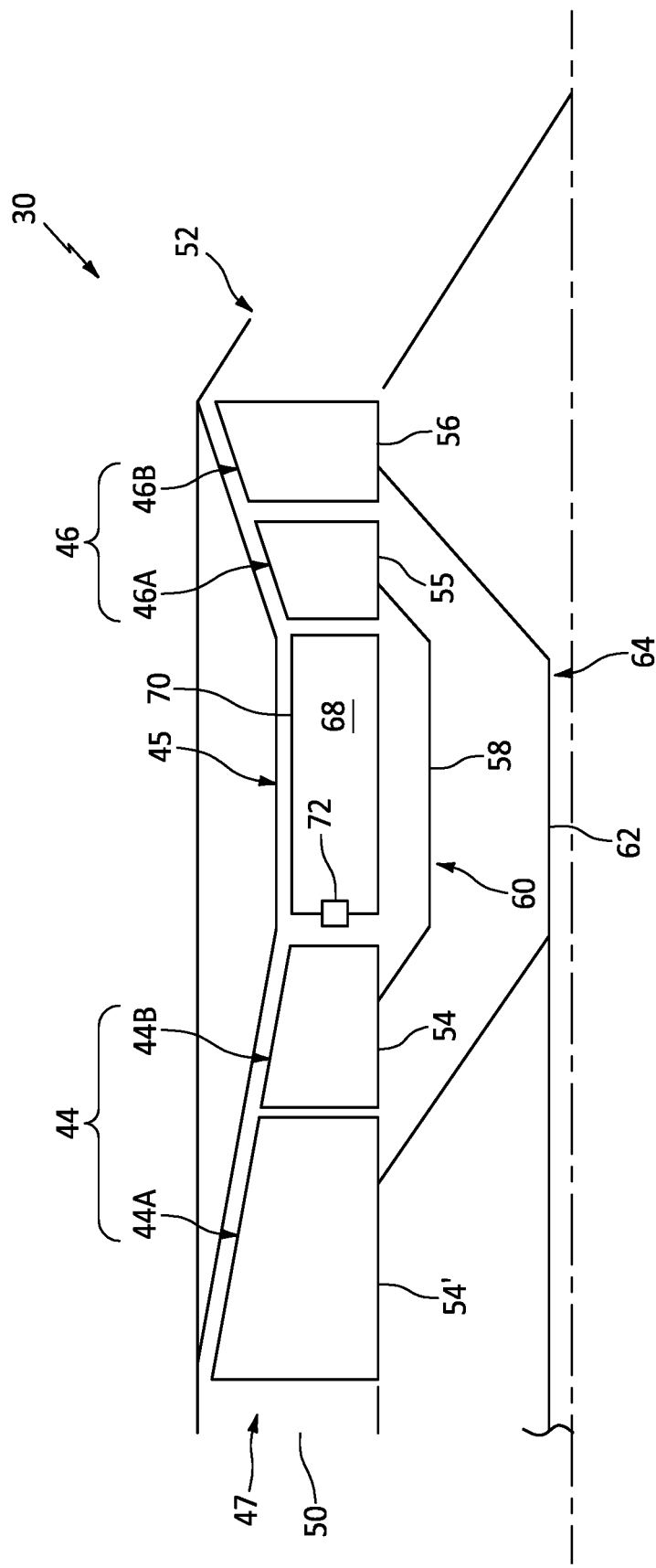
FIG. 6 is a schematic illustration of the first gas turbine engine configured with low and high pressure compressor sections.

In some embodiments, referring to FIG. 3, the low speed rotating structure 64 may be configured without a compressor rotor. In other embodiments, referring to FIG. 6, the low speed rotating structure 64 may include a low pressure compressor (LPC) rotor 54' arranged within a low pressure compressor (LPC) section 44A of the compressor section 44. In such embodiments, the compressor rotor 54 may be a high pressure compressor (HPC) rotor within a high pressure compressor (HPC) section 44B of the compressor section 44.

In some embodiments, referring to FIG. 1, the electric component 26 may be configured independent from driving operation of the propulsor rotor 22. In other embodiments, referring to FIG. 2, the electric component 26 may be configured as the electric motor (or the electric machine). An output of the electric component 26 and an output of the low speed rotating structure 64 may be (e.g., independently) mechanically coupled to the propulsor rotor 22 through the gearbox 66, or another gearbox. With such an arrangement, the aircraft powerplant 28 is configured as a hybrid powerplant that may selectively drive rotation of the propulsor rotor 22 with mechanical power generated by the first gas turbine engine 30 and/or electrical power generated by the second gas turbine engine 32 via the electric generator 24.

The first and the second gas turbine engines 30 and 32 may each have various configurations other than those described above. The gas turbine engine 30, 32, for example, may be configured with a single spool, with two spools, or with more than two spools. The gas turbine engine 30, 32 may be configured with one or more axial flow compressor sections, one or more radial flow compressor sections, one or more axial flow turbine sections and/or one or more radial flow turbine sections. The gas turbine engine 30, 32 may be configured with any type or configuration of annular, tubular (e.g., CAN), axial flow and/or reverser flow combustor. The present disclosure therefore is not limited to any particular types or configurations of gas turbine engines.

The aircraft powerplant 28 of FIG. 1 is depicted with a single first gas turbine engine 30 and a single second gas turbine engine 32. However, in other embodiments, it is contemplated the aircraft powerplant 28 may include multiple of the first gas turbine engines 30 in fluid communication with/boosted by the second gas turbine engine 32. It is further contemplated the first gas turbine engine(s) 30 may be in fluid communication with/boosted by multiple of the second gas turbine engines 32.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system for an aircraft, comprising:
a first gas turbine engine comprising a first inlet, a first exhaust, a first compressor section, a first combustor section, a first turbine section and a first flowpath fluidly coupled with and between the first inlet and the first exhaust, the first flowpath extending sequentially through the first compressor section, the first combustor section and the first turbine section, and the first combustor section comprising a combustor;
a propulsor rotor configured to be rotatably driven by the first gas turbine engine;
a second gas turbine engine comprising a second inlet, a second exhaust, a second compressor section, a second combustor section, a second turbine section and a second flowpath fluidly coupled with and between the second inlet and the second exhaust, the second flowpath extending sequentially through the second compressor section, the second combustor section and the second turbine section, the second inlet and the second exhaust each fluidly coupled with the first flowpath upstream of the first combustor section, the second inlet located in the first compressor section, and the second inlet is upstream of the second exhaust along the first flowpath, wherein the second gas turbine engine is configured as an auxiliary power unit for the aircraft;
an electric generator configured to be rotatably driven by the second gas turbine engine; and
an electric component configured to receive electricity generated by the electric generator, the electric component discrete from the first gas turbine engine;
wherein the electric generator is electrically discrete from one or more electric components of the first gas turbine engine.

2. The aircraft system of claim 1, further comprising an aircraft cabin electrical system comprising the electric component.

3. The aircraft system of claim 1, wherein the electric component is located within a fuselage of an aircraft.

4. The aircraft system of claim 1, further comprising:
a nacelle housing the first gas turbine engine;
the electric component located outside of the nacelle.

5. The aircraft system of claim 1, wherein
the electric component comprises an electric motor located outside of the first gas turbine engine; and
the electric motor is further configured to drive rotation of the propulsor rotor.

6. The aircraft system of claim 5, further comprising a gearbox mechanically coupling an output from the first gas turbine engine and an output from the electric motor to the propulsor rotor.

7. The aircraft system of claim 1, wherein
the second inlet is fluidly coupled to the first flowpath at an inlet coupling;
the second exhaust is fluidly coupled to the first flowpath at an exhaust coupling; and
the inlet coupling is upstream of the exhaust coupling along the first flowpath.

8. The aircraft system of claim 1, further comprising a flow regulator configured to regulate gas flow from the first gas turbine engine to the second gas turbine engine through the second inlet.

9. The aircraft system of claim 1, wherein the propulsor rotor comprises an un-ducted rotor.

10. The aircraft system of claim 1, wherein
the first gas turbine engine further comprises a low pressure compressor section; and
the first compressor section is configured as a high pressure compressor section between the low pressure compressor section and the first combustor section along the first flowpath.

11. The aircraft system of claim 1, wherein
the first gas turbine engine further comprises a low pressure turbine section; and
the first turbine section is configured as a high pressure turbine section between the low pressure turbine section and the first combustor section along the first flowpath.

12. The aircraft system of claim 1, wherein the second inlet is fluidly coupled to the second compressor section.

13. The aircraft system of claim 1, wherein the second exhaust is fluidly coupled with the first flowpath in the first compressor section.

14. An aircraft system, comprising:
a first gas turbine engine comprising a first compressor section, a first combustor section, a first turbine section and a first flowpath extending sequentially through the first compressor section, the first combustor section and the first turbine section, the first combustor section comprising a combustor, wherein the first gas turbine engine is configured as a turboshaft engine;
an un-ducted rotor configured to be rotatably driven by the first gas turbine engine, the un-ducted rotor comprising an array of rotor blades;
a second gas turbine engine comprising a second inlet, a second exhaust, a second compressor section, a second combustor section, a second turbine section and a second flowpath fluidly coupled with and between the second inlet and the second exhaust, the second flowpath extending sequentially through the second compressor section, the second combustor section and the second turbine section, the second inlet fluidly coupled with the first flowpath upstream of the combustor, the second exhaust fluidly coupled with the first flowpath in the first compressor section, and the second inlet is upstream of the second exhaust along the first flowpath;
an electric generator configured to be rotatably driven by the second gas turbine engine, the electric generator is electrically decoupled from the first gas turbine engine; and
an electric component configured to receive electricity generated by the electric generator, the electric component located outside of the first gas turbine engine.

15. The aircraft system of claim 14, wherein the electric component is configurable as an electric motor that drives rotation of the un-ducted rotor.

16. An aircraft system, comprising:
a first gas turbine engine comprising a first compressor section, a first combustor section, a first turbine section, a first rotating structure and a first flowpath extending sequentially through the first compressor section, the first combustor section and the first turbine section, the first combustor section comprising a combustor, and the first rotating structure comprising a first turbine rotor within the first turbine section;
an un-ducted rotor configured to be rotatably driven by the first rotating structure, the un-ducted rotor comprising an array of rotor blades;
a second gas turbine engine comprising an inlet, an exhaust, a second compressor section, a second combustor section, a second turbine section, a second rotating structure and a second flowpath fluidly coupled with and between the inlet and the exhaust, the second flowpath extending sequentially through the second compressor section, the second combustor section and the second turbine section, the inlet configured to bleed air out of the first flowpath upstream of the combustor, the exhaust configured to direct exhaust from the second gas turbine engine into the first flowpath, the inlet is fluidly coupled to the second compressor section, the inlet and the exhaust each fluidly coupled with the first flowpath upstream of the first combustor section, the inlet is upstream of the exhaust along the first flowpath, and the second rotating structure comprising a second turbine rotor within the second turbine section;
an electric generator configured to be rotatably driven by the second rotating structure; and
an electric component configured to receive electricity generated by the electric generator, the electric component independent of the first gas turbine engine, wherein the electric component does not enhance operation of the first gas turbine engine by helping to rotate and/or brake a rotor within the first gas turbine engine.

17. The aircraft system of claim 14, wherein the un-ducted rotor comprises a helicopter rotor.

18. The aircraft system of claim 14, wherein the second inlet is fluidly coupled to the first compressor section.

19. The aircraft system of claim 14, wherein the second inlet is fluidly coupled to the second compressor section.

20. The aircraft system of claim 16, wherein the inlet is fluidly coupled to the first compressor section.

* * * * *